No. 861,762. PATENTED JULY 30, 1907.
J. E. PACKARD.
COIN CONTROLLED MECHANISM.
APPLICATION FILED DEC. 15, 1904.

Witnesses:
Wm. P. Bond
Oscar W. Bond

Inventor:
John E. Packard,
By Banning & Banning
Attorneys.

No. 861,762.

PATENTED JULY 30, 1907.

J. E. PACKARD.
COIN CONTROLLED MECHANISM.
APPLICATION FILED DEC. 15, 1904.

No. 861,762. PATENTED JULY 30, 1907.
J. E. PACKARD.
COIN CONTROLLED MECHANISM.
APPLICATION FILED DEC. 15, 1904.

PATENTED JULY 30, 1907.

J. E. PACKARD.
COIN CONTROLLED MECHANISM.
APPLICATION FILED DEC. 15, 1904.

No. 861,762. PATENTED JULY 30, 1907.
J. E. PACKARD.
COIN CONTROLLED MECHANISM.
APPLICATION FILED DEC. 15, 1904.

Witnesses:
William P. Bond
Pierson W. Banning.

Inventor
John E. Packard
By Banning & Banning
Attys.

No. 861,762. PATENTED JULY 30, 1907.
J. E. PACKARD.
COIN CONTROLLED MECHANISM.
APPLICATION FILED DEC. 15, 1904.

Witnesses:
Wm P. Bond
Oscar W. Bond

Inventor:
John E. Packard
By
Attorneys.

UNITED STATES PATENT OFFICE.

JOHN E. PACKARD, OF CHICAGO, ILLINOIS, ASSIGNOR TO MULTI-VENDING COMPANY, OF PIERRE, SOUTH DAKOTA, A CORPORATION OF SOUTH DAKOTA.

COIN-CONTROLLED MECHANISM.

No. 861,762.   Specification of Letters Patent.   Patented July 30, 1907.

Application filed December 15, 1904. Serial No. 236,975.

*To all whom it may concern:*

Be it known that I, JOHN E. PACKARD, a citizen of the United States, residing at Chicago, in the county of Cook and State of Illinois, have invented certain new and useful Improvements in Coin-Controlled Mechanism, of which the following is a specification.

The invention relates more particularly to coin controlled mechanism designed or intended for use in connection with vending machines, but which can be used with other machines and for other purposes.

The objects of the invention are to furnish a lever loosely mounted on a rock shaft and carrying a plunger which engages a coin held in a coin receiver or cradle and by the engagement rocks the shaft; to prevent a too rapid return of the coin receiver and the coin stop or retainer to normal position; to actuate the controlling mechanism through the medium of a rack and pinion, operated from the exterior of the casing inclosing the mechanism; to furnish a stop to prevent the return of the coin receiver or cradle until a full advance thereof to discharge the coin has been accomplished; to furnish a stop against the return of the coin support until the coin has been dropped from its receiver or cradle; to prevent a too rapid return of the coin support after a coin has been deposited; to prevent a return of the pinion and rack before a full throw has been made; and to improve generally the construction, arrangement and operation of the various elements entering into the mechanism as a whole.

The invention consists in the features of construction and combinations of parts hereinafter described and claimed.

In the drawings Fig. 19 an end view of the handle or key.

The mechanism is mounted on a base plate 1, extending up from which at the front are standards 2, each of which, as shown, is cut away at its upper portion 3, so as to lessen the thickness of the standards. A rock shaft 4 is mounted in the upper portions 3 of the standards 2, and on this shaft are fixed uprights or standards 5, each having a hub 6 through which and the shaft 4 a pin 7 passes, securing the uprights or standards 5 fixedly to the shaft 4, so that, with the rock of the shaft 4, the uprights or standards 5 will be swung or oscillated.

Figures 5, 6, 7, 8, 9, 10, 11, 12, 13:
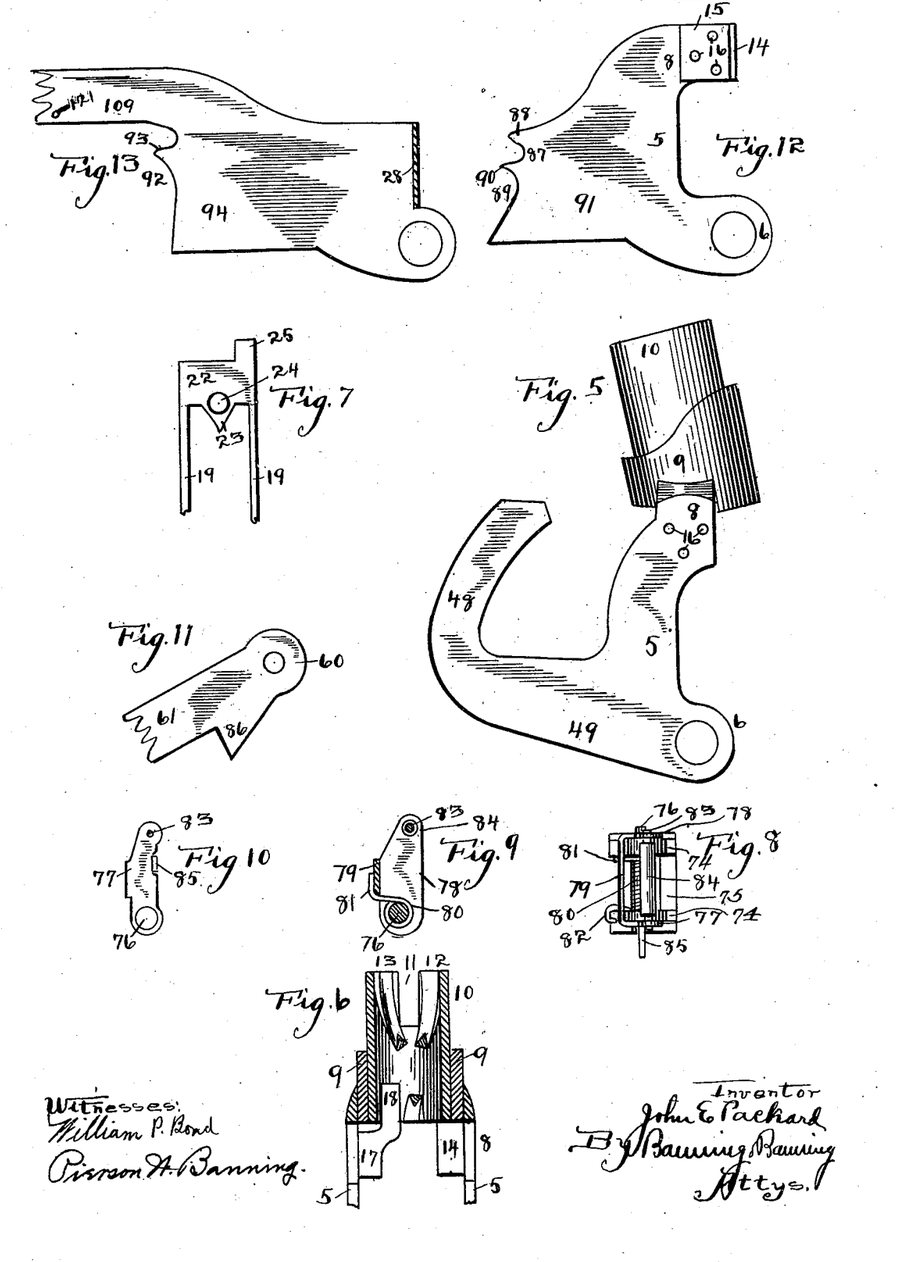
Fig. 5 a detail, being a side elevation of the coin receiver or cradle and one of its supporting standards.
Fig. 6 a sectional elevation of the coin receiver or cradle.
Fig. 7 an end elevation of the stationary member of the coin receiver or cradle with its standards broken off.
Fig. 8 a top or plan view of the stop for preventing a return of the parts to normal position until the full advance has been made for the coin receiver or cradle.
Fig. 9 a cross section of the stop shown in Fig. 8.
Fig. 10 an end elevation of one standard of the stop of Fig. 8.
Fig. 11 a detail showing one end of the rack bar with the shoulder or projection for returning the stop of Fig. 8 to normal position.
Fig. 13 a side elevation, showing one plate or support for the coin retainer, with the notches for preventing a return of the coin retainer until after the coin has been dropped.
Figure 14:
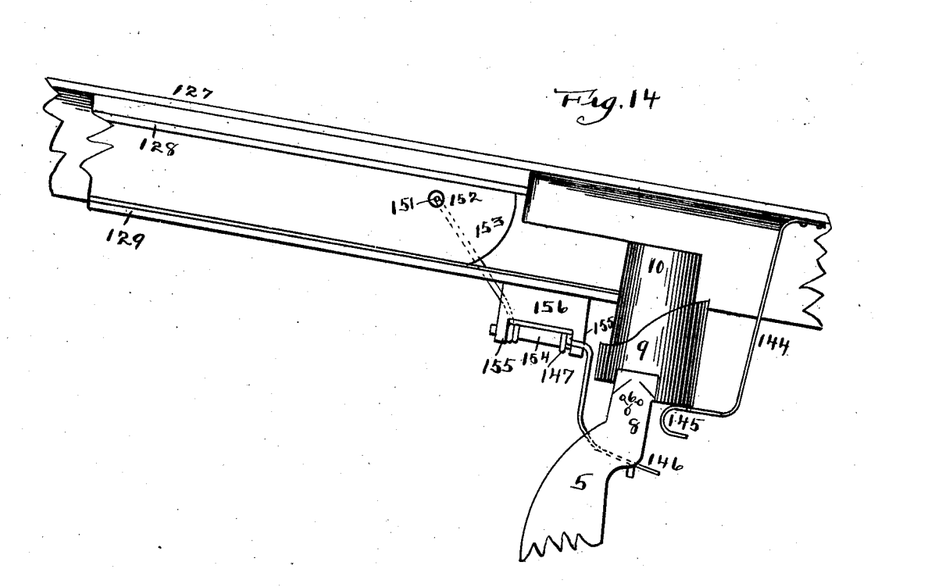
Fig. 14 a detail, being a side elevation showing the coin receiver or cradle, the coin chute and the device for preventing the deposit of more than one coin.
Figure 15:
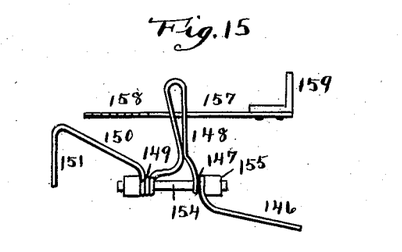
Fig. 15 a top or plan view of the device for preventing the deposit of more than one coin.
Figure 16:
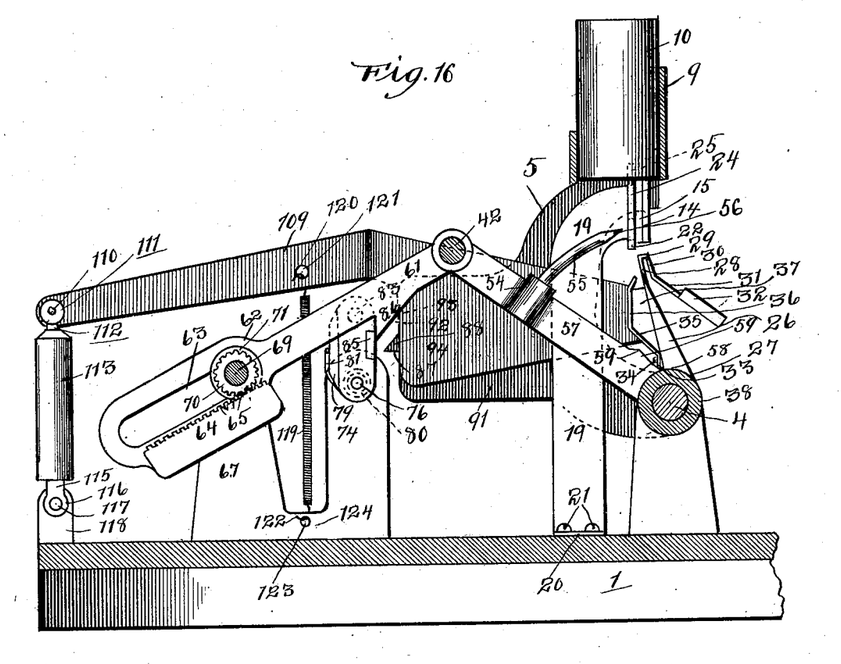
Fig. 16 a side elevation partly in section, showing, on an enlarged scale as compared with Figs. 1 and 2, the actuating mechanism for the coin carrier or cradle.
Figure 17:
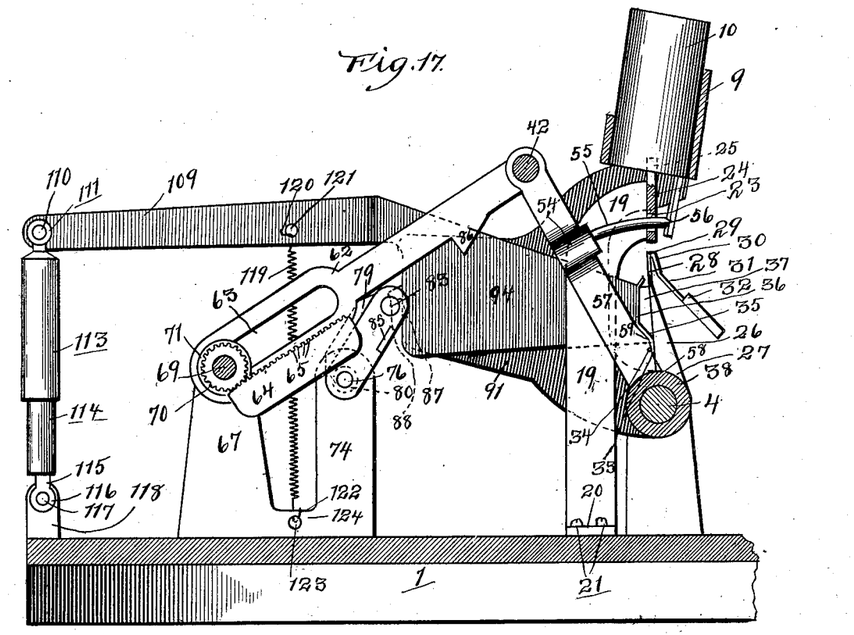
Fig. 17 a similar view to Fig. 16 with the coin cradle or carrier advanced,—Fig. 16 showing the coin cradle or carrier in its normal position.
Figure 18:
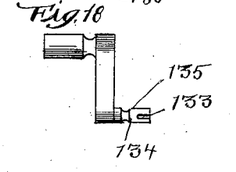
Fig. 18 a side elevation of the handle or key for turning the pinion shaft.
Figure 20:
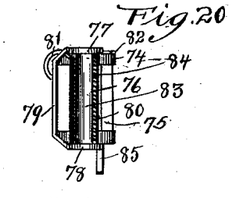
Fig. 20 a top or plan view of the stop for preventing return of the parts to normal position.
Figures 21, 22, 23:
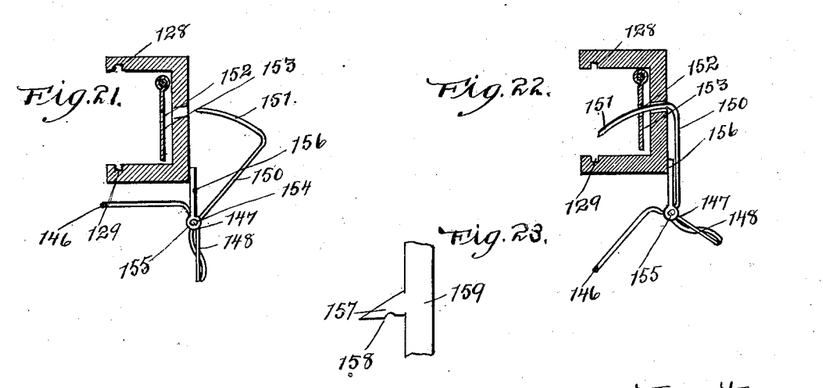
Fig. 21 a detail in cross section showing the ejector for discharging a false coin or token with the ejector in its receded position.
Fig. 22 a similar view to Fig. 21 with the ejector in its advanced position.
Fig. 23 a detail showing the stop for holding the ejector of Figs. 22 and 23 in position.

The upper end 8 of each standard 5 has mounted thereon or fixedly secured thereto by any suitable means, a shell or casing 9 into which is entered the shell or wall 10 of the coin receiver or cradle. This wall 10, on the rear or entering side thereof, has a slot 11 for the passage of a coin standing vertically edgewise, and within the shell or wall 10 on opposite sides are spirals 12 and 13, by means of which the coin is maintained in a vertical edgewise position and is turned so as to stand crosswise of the position in which it entered the coin receiver or cradle. The upper end 8 of one upright or standard 5 has inwardly extending therefrom a guide 14, which guide, as shown, is a flange or turned edge of a plate 15 attached to the end 8 by rivets 16 or otherwise. The upper end 8 of the opposite upright or standard 5 has a guide 17 in alinement with the guide 14, and like the guide 14 formed by a flange or turned edge of a plate 15 attached to the end 8 by rivets 16 or otherwise. This guide 17 has a continuation 18 upwardly projecting into the space of the spirals, as shown in Fig. 6, and furnishes a contact by which, when the coin has reached a crosswise position, it will be held against further twisting or turning and be caused to descend in a vertical crosswise position to the point where it is held or retained.

At the rear of the rock shaft 4 are two uprights or standards 19, each having at the bottom a flange 20 through which screws 21 or other fastening means pass and enter the base plate 1, holding the two standards or uprights in a fixed position. The upper ends of the standards or uprights 19 are connected together by a cross plate 22 depending from which, in the construction shown, is a point 23 with a hole 24, see Fig. 7, partly in the point and partly in the cross plate. The cross plate at one end has an upward extension forming a guide 25 to coact with the guide 18 and insure the descent of the coin in a vertical crosswise position. The uprights or standards 5, with the wall or shell 10 and its spiral pathway, form the movable section of the coin receiver or cradle, and the standards or uprights 19, with the cross plate 22, form the fixed or stationary section of the coin receiver or cradle, and in operation the coin descends so as to lie in front of the cross plate 22, with the center of the coin approximately in line with the center of the hole 24, and with the edges of the coin located between the guides 14, 17 and 18, and the cross plate 22 and guide 25, so that its outer face at the edge can be forced against the guides or flanges 14 and 17 and carry or swing the movable section of the coin receiver or cradle to its advance position, rocking the shaft 4 in such movement.

Figure 1:
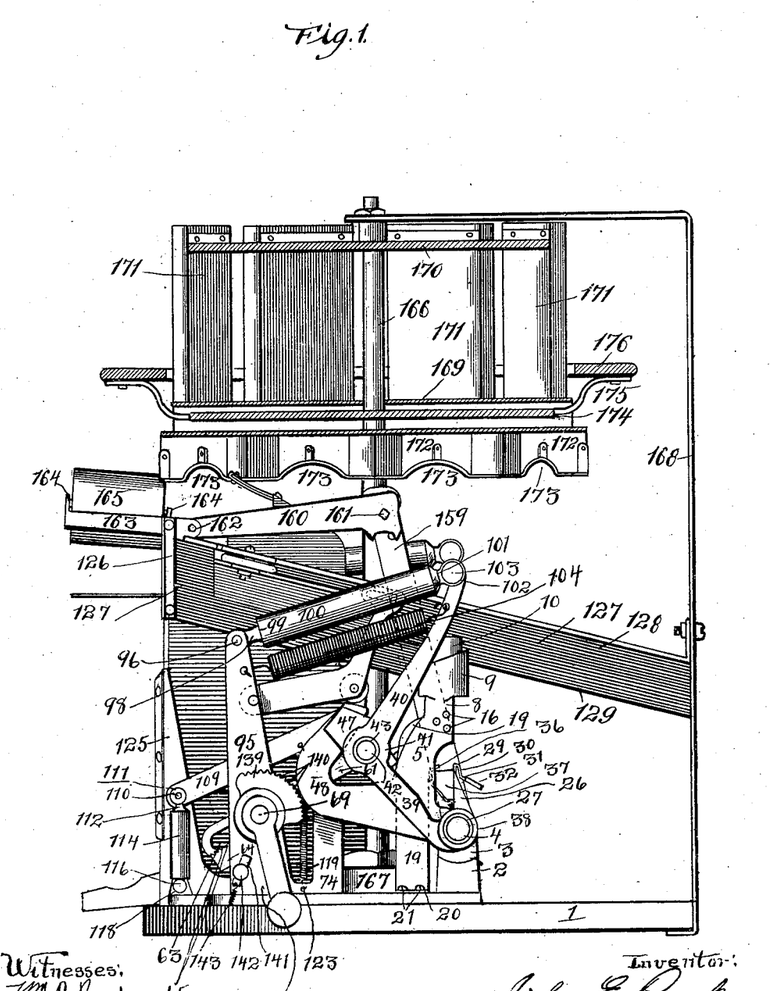
Figure 1 is a side elevation of the actuating mechanism for the ejector with a package carrier in sectional elevation, and with the deflector or kicker for the coin omitted to prevent confusion.
Figure 2:
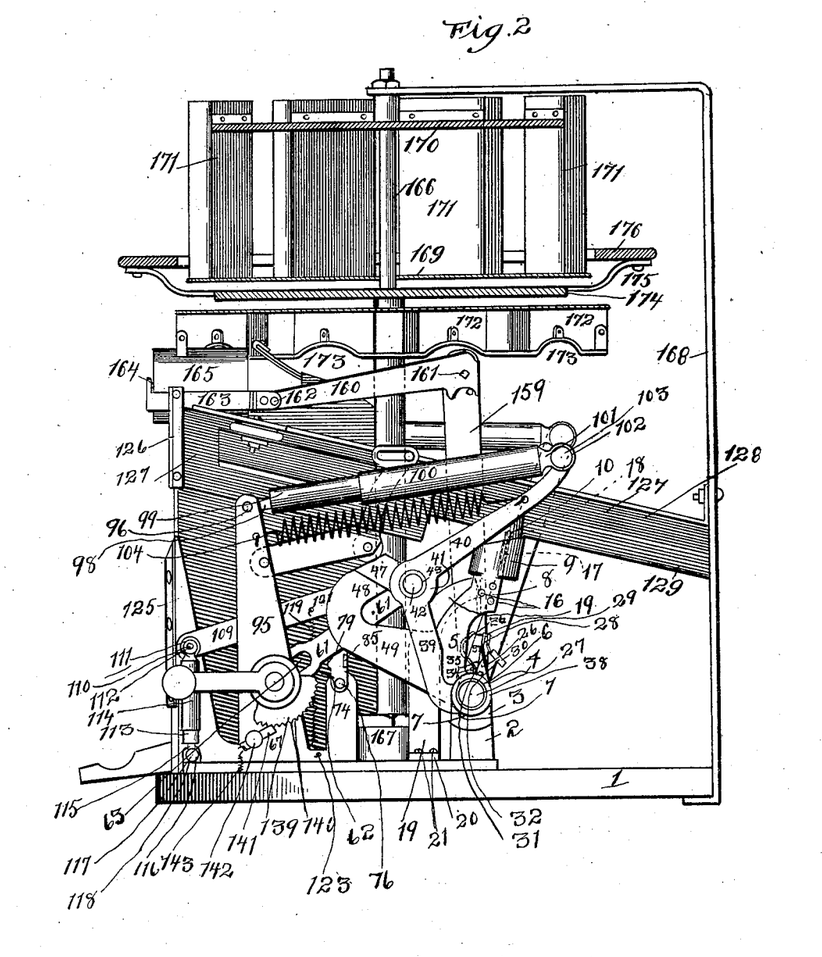
Fig. 2 a similar view to Fig. 1 with the coin receiver and the discharging roller advanced to discharge a package from the package carrier,—Fig. 1 showing these parts receded.
Figure 3:
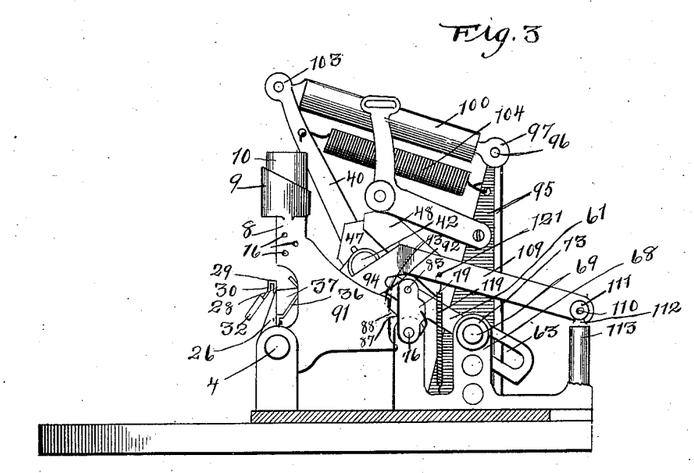
Fig. 3 a side elevation of the coin carrier and the actuating means therefor, showing the opposite side thereof to Figs. 1 and 2.
Figures 4, 12:
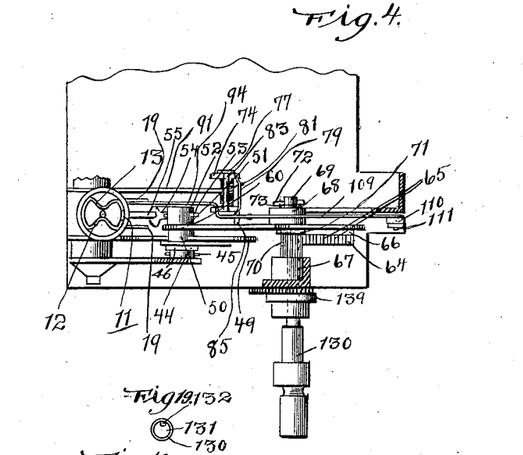
Fig. 4 a top or plan view of the mechanism for actuating the coin carrier or cradle.
Fig. 12 a detail, being a side elevation of an arm or standard for the coin receiver or cradle showing the notches for preventing a return of the coin receiver or cradle until the terminus of a full throw.

A pair of plates 26, each having a base 27 are loosely mounted by their bases on the rock shaft 4, so as to be free to swing on the shaft. A back plate 28 connects the two side plates 26, and this back plate 28 at its top is turned forward to form a ledge 29, as shown in Figs. 1 and 2; and depending from the ledge 29 is a plate 30, continuing from which, with a downward incline, is a plate 31 having at each end thereof a flange 32, in the construction shown. These parts, from 26 to 32 both inclusive, form the retainer for holding the coin in its deposited position between the guides of the movable and fixed sections of the coin receiver or cradle, the coin resting at its lower edge on the face of the ledge 29; and with the advance movement of the movable section of the coin receiver or cradle, the coin is carried forward to a position where its lower edge clears the front edge of the ledge 29, so that, with the release of the pressure against the face of the coin, the coin is free to descend and strike the plate 31 and pass down such plate to the place of deposit, and in its passage the coin is held against its being thrown off, at the ends of the plate, by the flanges 32, thus insuring the passing of the coin into the receiving box or place of deposit therefor. A plate 33 is attached by rivets 34, or otherwise, to the back plate 28, and this plate 33 is bent at right angles to form a bottom 35 of a slug discharging receptacle, which bottom 35 has an inclination toward the side of the mechanism. The slug discharging receptacle is formed in the space between the back plate 28 and a plate 36 extending upward from the bottom 35, which plate 36 at its upper end has a rearward curve and extends above the plane of the ledge 29, with a space or mouth which will insure the deposit of the slug or false token into the discharging receptacle therefor; and in order to insure the slug or false token passing from its receptacle in one direction only, the bottom has extending up therefrom a wall or plate 37, located between the plates 28 and 36, and forming a stop against movement of the slug or false token in that direction.

A hub 38 is loosely mounted on the end of the shaft 4, and extending rearward and upward from this hub is one section 39 of the actuating lever. The other section 40 of the actuating lever extends forward and upward and is joined to the section 39 by a center 41 having entered thereinto the end of a shaft or rod 42, which, as shown, is fixedly held in the center 41 by an upset or flange 43 on the end of the shaft and a collar 44, secured to the shaft or rod by a pin 45, which passes through the collar and the shaft or rod. The collar 44 has a flange 46 to which is secured a guide plate 47, which contacts the side face of a guide 48 extending upwardly and forwardly from an arm 49, which is a continuation of or secured to one of the uprights or standards 5, so that with the movement or swing of the operating lever, its movement or swing will be guided by the guides 47 and 48, and will be in unison with the movements of the movable section of the coin receiver or cradle. The shaft or pin 42 has a section 50 extending under the guide 48, and from the section 50, the shaft has a section 51 of reduced diameter, on the end of which is secured a hub or head 52 by a cross pin 53, passing through the head 52 and the shaft 51; so as to fixedly secure the hub or head to the shaft. The head or hub 52 has a boss or extension 54 downwardly and forwardly projecting in which is secured a rod or plunger 55, the forward end 56 of which is pointed or tapered so as to pass through the opening or hole 24 and engage the face of the coin in the space between the plate 22 and the guides 14 and 17 of the movable section of the coin receiver or cradle. An arm 57 continues downwardly and forwardly from the boss 54 and terminates in a hub 58, which is loosely mounted on the rock shaft 4, and this arm 57 has on its upper edge a projection or contact 59, so located and arranged as to engage the plate 33, with the upward and forward movement of the arm 57, and by such engagement move the coin stop or retainer forwardly and into position where the ledge 29 will be carried to a point so that, when the coin receiver or cradle is further advanced, the lower edge of the coin will be outside of the plane of the forward edge of the ledge, allowing the coin to descend with the initial rearward movement of the plunger or rod 55 for the coin to pass into its receiving box or other place of deposit as already described.

The shaft or pin section 51 has mounted thereon a head or collar 60, extending from which is an arm 61 having its rear end 62 enlarged with a slot 63 therein. A rack bar 64 is attached to one side face of the end 62, which bar has on its upper face cogs or leaves 65 to be engaged by a pinion; and between the cogs 65 of the rack bar and the face of the end 62 is a groove or recess 66, furnishing a guideway for the travel of the arm or bar 61 in its reciprocating movement. A post 67 extends upwardly from the base plate 1, and a companion post 68 also extends upward from the base plate 1, which posts 67 and 68, at their upper ends, have mounted therein a shaft 69 on which, adjacent to the inner face of the post 67, is secured a pinion 70, the cogs of which mesh with the cogs 65 of the rack bar, and on the shaft 69 adjacent to the inner end of the pinion 70 is a washer 71 which enters the groove or channel 66 and serves as a guide to hold the arm or bar 61 in a direct line of reciprocation. The inner end of the shaft 69 has entered therethrough a pin 72, between which and the outer face of the post 68 is a washer 73, which holds the shaft against end play, and at the same time allows it to be freely turned or rotated. The shaft 69 is manually turned or revolved for the pinion 70 to engage the cogs 65 of the rack bar and give a reciprocating movement to the arm or bar 61 by which, through the shaft or rod 42, and its reduced section 51, the operating lever, having the sections 39 and 40, will, through the section 39, turning on the shaft 4 advance the rod 42 and through the head or hub 54 and the arm 57 operate the plunger 55 and the coin stop or retainer, as already described.

The base plate 1 has extending up therefrom, rearwardly of the standards or uprights 19, posts 74 between which on the front side is a wall or cross plate 75; and fixedly secured in the upper ends of the posts 74 is a shaft or rod 76, on one end of which is loosely mounted the lower end of an arm or plate 77, and on the other end of which is loosely mounted the lower end of an arm or plate 78, which arms or plates are connected together on their rear sides by a cross plate or bar 79, so that the two arms or plates 77 and 78 will swing in unison from the rod or shaft 76 as a pivot.

A coil spring 80 encircles the rod 76, and this spring has one end 81 outwardly and upwardly extended for engagement with the cross bar or plate 79; and the other end 82 of this spring is extended outwardly and engaged with the post 74, so that the spring exerts a force to carry the arms 77 and 78 forward. A rod 83 is fixedly secured in the upper ends of the arms 77 and 78, and on this rod between the arms is mounted a sleeve 84, which is free to turn on the rod. The arm 77 has extending out therefrom a stop 85, and on the arm or bar 61 is a projection or contact 86 so located and arranged in relation to the stop 85 as to be withdrawn from the stop 85 with the advance of the arm or bar 61, allowing the spring 80 to act and force the arms 77 and 78 with the sleeve 84 forward, and with the return movement of the arm or bar 61 the projection 86 engages the stop 85 and carries the arms 77 and 78 with the roller or sleeve 84 back to normal position. The roller is free to engage, when in its forward position with a notch 87 below a tooth or point 88 and a notch 89 below a tooth or point 90, formed in the edge of a plate 91, which, as shown, is a continuation of one of the uprights or standards 5, but which could be a separate piece fixedly attached to the upright or plunger. The roller or sleeve 84, when in its forward position, is free to engage with a notch 92 below a point or tooth 93 formed in the edge of a plate 94, which plate, as shown, is an extension from the back plate 28 of the coin retainer. The engagement of the roller or sleeve 84, with the notch 87, takes place when the movable section of the coin receiver or cradle has been partially advanced, and, until released, holds the coin receiver or cradle against a return movement, and the notches 89 and 92 are engaged by the roller or sleeve 84, when the coin receiver or cradle and the coin retainer have been both respectively carried to the limit of their advance swing or movement, and when so engaged the receiver or cradle and the coin retainer are held against a return movement until the sleeve is free to move forward with the advance of the coin receiver or cradle, owing to the withdrawal of the projection from its normal position, allowing the arms 77 and 78 to swing forward, and the sleeve is released from its engagement with the notches 89 and 92, when the bar 61 has carried the projection 86 backward so as to force the arms 77 and 78 rearward by the engagement with the stop 85, with the result that when the bar 61 has reached the limit of its rear movement, the sleeve 84 is wholly withdrawn from the notches and the coin receiver or cradle and the coin retainer are free to return to their normal position for the reception and retention of another coin.

A standard 95 extends up from the post 67 and its upper end receives a pivot 96 on which is mounted the eye 97 of a stem 98, extending out from the end of the piston 99 of a dash pot, the cylinder 100 of which incloses the piston 99 and has a stem 101, terminating in an eye 102 mounted on a pivot 103 in the upper end of the section 40 of the operating or actuating lever. A coil spring 104 is located below the dash pot, and one end 105 thereof is hooked into a hole 106 in the upper end of the section 40 of the actuating lever, and the other end 107 of which is hooked into a hole 108 in the standard 95, so that with the forward throw of the upper end of the lever the cylinder 100 of the dash pot will be carried outward of the piston or plunger and the spring 104 will be expanded and placed under a tension that will act to return the actuating lever, the rock shaft and the parts connected with the lever and rock shaft to normal position, and in such return the dash pot acts and prevents any jar or concussion from the force of the spring that would cause injurious effects or damage to the operative parts. An arm 109 extends rearwardly from the plate 94, and its outer end has therein a pivot 110 on which is mounted the eye 111 of a stem 112 extending from the end of the cylinder 113 of a dash pot, in which cylinder is the piston or plunger 114, having a stem 115 with an eye 116, mounted on a pivot 117, projecting out from a boss 118 on the base plate. A coil spring 119 has its upper end 120 hooked into a hole 121 in the arm 109, and has its lower end 122 hooked into a hole 123, in a rib or flange 124 on the base plate of the machine. The arm 109 at its outer end is raised with the forward movement of the coin retainer, and with such upward movement of the outer end of the arm the cylinder of the dash pot is raised on the piston, and the spring 119 is placed under a downward tension or pull, so that when the coin retainer is released by the return of the rod or plunger 55, the spring 119 will act to return the arm 109 to its normal position, and in such return the dash pot prevents any jar or concussion that would cause injury or damage to the parts. It will be seen that by means of the dash pot the return of the movable section of the coin receiver or cradle is rendered slow owing to the slow return of the actuating lever, and that by means of the dash pot the return of the coin retainer is made slow by the slow return of the arm 109, thus giving plenty of time in the movements of the coin receiver or cradle and the coin retainer for the discharge of a good coin forward of the coin retainer and the discharge of a slug or false token rearward of the coin retainer, as well as preventing injury and damage from jar or concussion.

A standard 125 extends upward from the base plate 1, and to the upper end of this standard is secured the receiving end 126 of a coin chute 127, which chute in the construction shown has a ledge 128 at the top and a ledge 129 at the bottom, which ledges form a trackway of travel for a coin standing vertical to pass down the chute and enter the slot 11 of the coin receiver or cradle, so as to be turned by the spirals 12 and 13 into a vertical crosswise position, with its body between the guides 14 and 17 and the plate 22 and its lower edge rest on the coin retainer, in position for the initial advance of the rod or plunger 55 to engage the face of the caught coin, and by such engagement with the further advance of the rod or plunger carry the movable section of the coin retainer or cradle away from the fixed section.

The outer end of the shaft 69 has a socket 130, the chamber 131 of which has a spline 132, which enters a recess 133 in the body of a stem 134, which stem has a circumferential groove 135 to receive a lock plate, not shown on the casing of the machine. The stem 134 projects out from a head 136 having a handle 137 with a grab 138, so that by raising and lowering the handle the stem 134 will be oscillated back and forth, and with such oscillation the shaft 69 will be revolved forward and back, causing the pinion 70 to actuate the arm or bar 61 through the rack on such arm or bar and with which the pinion engages. The shaft 69 has fixedly secured thereon a cog segment 139, the teeth 140 of which engage the acting end of the pawl 141, mounted on a pivot 142, and held normally erect by a coil spring 143. The pawl 141 is free to swing on its pivot 142, and with the downward movement of the ratchet plate 139, as the advance end of such plate strikes the acting end of the pawl, it will turn such end so that the ratchet teeth 140 are free to pass over the acting end of the pawl, as long as the ratchet plate is turned forward, but if the forward movement of the plate is discontinued before the end of the teeth 65 is reached, then the acting end of the pawl engages a tooth of the ratchet plate and prevents any return of the ratchet plate and consequently any return of the arm or bar 61, and the parts actuated from such arm or bar. The continued turning of the ratchet plate 139, until its rear end has passed the acting end of the pawl 141 renders the pawl nonacting on the return movement of the ratchet plate, as with such movement the rear edge of the ratchet plate will strike the acting end of the pawl and swing it out of the way, so that the teeth of the ratchet plate are free to ride over the acting end of the pawl, allowing the parts to be returned to normal position by the action of the return springs. It will thus be seen that by means of this ratchet plate and pawl a full throw of the bar 61 has to be made in order to release the engagement between the ratchet plate and pawl, and until such release occurs, the operative parts of the mechanism cannot return to normal position, thus preventing a partial throw of the arm or bar 61 from operating the mechanism and obtaining results therefrom without the deposit of the coin.

The operation is as follows: A coin is entered into the receiving end 126 of the coin chute 127, and rolls down the trackway of the chute standing vertically edgewise, and in this position enters the spiral of the coin receiver or cradle through the slot 11, and descending is turned by the spiral so as to stand crosswise and vertically edgewise with its lower edge resting on the coin retaining ledge 28, and its body between the guides 14 and 17, and the plate 22. The coin is now in position for the operator of the mechanism to actuate the same, which is done by raising the handle so as to turn the shaft 69 in a direction for the pinion 70, by its engagement with the cogs 65 of the rack bar, to advance the arm or bar 61, and in such movement the teeth of the ratchet plate ride over the pawl, which is pressed down at its acting end in position to engage the ratchet teeth, when the turning of the ratchet plate is stopped before the expiration of the full throw of the arm or bar 61, and the full advance of the coin controlled mechanism. The forward or advance movement of the arm or bar 61, through its connection with the shaft or rod 42 and the reduced section 51 of such rod, moves the actuating lever for the lower end 39 of such lever to turn on the shaft 4 and for the upper end 40 of such lever to extend the dash pot and expand the spring, and at the same time the head or hub 52 is carried forward, raising the arm 57, and forcing at the initial advance, the end of the plunger or rod 55 against the face of the coin, so that with the further advance of the rod or plunger to the limit of the forward movement of the arm or bar 61, the movable section of the coin receiver or cradle, with the coin held between the end of the plunger or rod and the guides 14 and 17, will be swung forward to the limit of its movement, and with the advance of the movable section of the coin receiver or cradle, the projection 59 will strike the rear face of the coin retainer and carry the ledge 29, on which the lower edge of the caught coin rests, forward a sufficient distance to bring the slug or false token chamber into position where a slug or false token will drop into such chamber with the initial return of the plunger or rod, and in position where a coin of the proper denomination, with the initial return of the plunger or rod, will descend and pass down on the plate 31 and be discharged into the coin box or receptacle. The advance of the operative parts of the mechanism places the spring 104 and the spring 119 under a tension, so that with the release of the handle by the operator, these springs will act to return the actuating lever 39, 40, and the arm 109, to normal position, and with the return of the actuating lever and the arm 109, the coin receiver or cradle and the coin retainer will both be returned to their normal positions, and in such return, by reason of the dash pots, a slow movement is obtained, which will effectually prevent any jar or concussion that would damage or injure the operative parts. The mechanism is operative with each deposit of a coin of the proper denomination, and each deposited coin is dropped from the coin receiver or cradle when the limit of the advance movement thereof is attained, and at the initial return movement of the plunger or rod. Each advance of the movable section of the coin receiver or cradle is transmitted to and rocks the shaft 4, and this shaft can be connected with a discharging mechanism or other appliance, so as to operate the same from the deposit of the coin. The mechanism is effective in use, as the coin is delivered on a roll edgewise into the coin receiver or cradle and descends edgewise therein and is turned crosswise and brought into position to be engaged by the plunger, and with the engagement of the plunger a coin movable section of the receiver or cradle is carried away from the fixed section and into a position at the limit of its advance movement where the coin can be released and will drop into a coin box or other receptacle, and, at the same time, should a washer be employed, the hole in the washer will be in line with the throw of the rod or plunger 55, so that the rod or plunger will pass bodily through the hole or eye of the washer and will not carry forward the movable section of the coin receiver or cradle, but the coin retainer will be carried to a position where, on the withdrawal of the rod or plunger, the washer will drop into the slug receptacle and be discharged without operating the mechanism. A soft metal slug will be inoperative, as the pressure of the rod or plunger 55 in its advance will be sufficient to bend the metal and force the slug out from the guides, and this before the movable section of the coin receiver or cradle has been advanced to a position for operative purposes. The throw of the actuating lever and the coin rod or plunger is positive by the action of the pinion and rack, and so long as these parts are operative, the mechanism will perform the required work. The several elements coöperate and the mechanism as a whole is very strong and durable.

A coin which has been gummed on its face to stick in the coin receiver or cradle so as to remain in position after the withdrawal of the plunger is forced from its stuck position by a spring 144 attached to the supporting bar of the coin chute and having its end 145 turned to present a circular or curved face, which will cause the spring to yield with the advance of the movable section of the coin receiver or cradle, such yield placing the spring 144 under a sufficient tension to produce a recoil which will disengage the gummed coin from its engagement and cause such coin to drop with the return of the coin receiver or cradle to normal position. It is desirable to prevent the deposit of more than one coin in the receiver or cradle, and for this purpose what is termed a deflector or kicker is provided. The deflector or kicker, in the construction shown, is formed from a wire bent to have an arm 146, which projects forward of and below the coin receiver or cradle, and lies adjacent to the projecting point 23 of the fixed section of the coin receiver or cradle and below the cross plate 22 of such section. This arm terminates in a coil 147 joined by an arm 148 with a coil 149, extending out from which is an arm 150 terminating in an end 151, which projects through a hole 152 in the discharging plate 153 of the coin chute. The coils 147 and 149 encircle a pin 154 mounted in ears 155 of a plate 156 attached to the coin chute 127, or to the supporting bar of such chute. The arm 148 projects laterally and is located above a plate 157 having notches 158 in its edge and secured to a swinging standard or support 159 of the frame carrying the package discharger. A pair of standards or supports 159 are fixedly mounted on the shaft 4 and to the upper end of these standards are attached bars or side plates 160 by a pivot or cross rod 161, for the bars or side plates 160 to constitute a carriage having at the forward end pivots 162 for the attachment of a stirrup 163 having journal pins or pivots 164 for mounting a discharging roller 165, by the advance of which a package is discharged from the package carrier.

The package carrier is mounted on a shaft 166, supported in a step 167 at its lower end and by a brace 168 at its upper end. The shaft has secured thereto a lower plate 169 and an upper plate 170 between which is mounted or secured a plurality of receptacles or chambers 171 constituting the package carrier. A supporting plate 172 is located below the package carrier, and depending from this plate is a track having a plurality of curved faces 173 one curved face in line with each receptacle or chamber so that the engagement of a curved face 173 with the periphery of the discharging roller 165 will hold the package carrier in position for the discharge roller to push out a package. The shaft 167 has fixedly secured thereto a plate 174 from which extend outwardly braces 175 supporting a ring 176 by means of which the purchaser can turn the package carrier into position to bring the desired receptacle or compartment 171 into line with the discharge roller 165, so that on the deposit of a proper coin the discharge roller can be advanced to deliver the article purchased to the purchaser.

The operation is as follows. The deposit of a coin in position in the coin receiver or cradle, by the engagement of the edge of the coin with the arm 146 swings the arm laterally and through the coils 147 and 149 advances the arm 150, projecting the end 151 of the arm 150 through the hole 152, so that a second coin or any subsequent number of coins deposited in the receiving end 126 of the coin chute will roll down the pathway of the chute and, striking the end 151, will be deflected or turned from the pathway and pass into a returnway by which the coin will be delivered to the depositor. This deflecting of coins will continue so long as a coin remains in the receiver or cradle in engagement with the arm 146, but with the discharge of the coin from the receiver or cradle the arm 146 returns by gravity to its normal position, rocking the deflector or ticker as a whole on the coils 147 and 149, returning the arm 150 to normal position and withdrawing the end 151 from its projection through the hole 152 of the coin chute discharging plate. It will be impossible to operate the discharging device for the package with a coin retained in the receiver or cradle as the arm 148 by its engagement with the plate 157, in the event of a partial swing of the frame or support 159, will project the end 151 of the deflector or kicker through the hole 152, and prevent a coin from passing down the pathway of the chute until the mechanism has been fully operated to discharge a package, so that with a coin in the receiver or cradle it will be impossible to deposit a second coin or to operate the discharging mechanism for the package until the deposited coin has been delivered from the coin receiver or cradle.

What I regard as new and desire to secure by Letters Patent is:

1. In a coin controlled mechanism, the combination of a rock shaft, a coin receiver or cradle having a movable section fixed on the rock shaft, a coin retainer located below the movable section of the coin receiver or cradle and pivotally mounted on the rock shaft, means for giving a limited movement to the coin retainer from and coincident with, and a movement independently of the coin receiver or cradle, an actuating lever having a downwardly extending arm and an upwardly extending arm with the downward arm loosely encircling the rock shaft, a shaft laterally projecting from the actuating lever at the juncture of the two arms, a head fixed on the shaft, a plunger connected with the head and adapted to engage a coin caught and held in the movable section of the coin receiver or cradle by the coin retainer, a rack bar connected with the projecting lateral shaft of the actuating lever, and a revoluble pinion for reciprocating the rack bar, substantially as described.

2. In a coin controlled mechanism, the combination of a rock shaft, a coin receiver or cradle having a movable section fixed on the rock shaft, a coin retainer located below the movable section of the coin receiver or cradle and pivotally mounted on the rock shaft, means for giving a movement to the coin retainer independently of the coin receiver or cradle, an actuating lever having a downwardly extending arm and an upwardly extending arm with the downward arm loosely encircling the rock shaft, a shaft laterally projecting from the actuating lever at the juncture of the two arms, a head fixed on the shaft, an arm depending from the head, and pivotally supported at its lower end, a plunger carried by the arm and adapted to engage a coin caught and held in the movable sections of the coin receiver or cradle by the coin retainer, and a projection on the arm engaging with and moving the coin retainer forward coincident with the advance of the movable section of the coin receiver or cradle, substantially as described.

3. In a coin controlled mechanism, the combination of a rock shaft, a coin receiver or cradle having a movable section fixed on the rock shaft, a coin retainer located below the movable section of the coin receiver or cradle and pivotally mounted on the rock shaft, means for giving a movement to the coin retainer independently of the coin receiver or cradle, an actuating lever having a downwardly extending arm and an upwardly extending arm with the downward arm loosely encircling the rock shaft, a shaft laterally projecting from the actuating lever at the juncture of the two arms, a head fixed on the shaft, an arm depending from the head and journaled on the rock shaft, a plunger carried by the arm and adapted to engage a coin caught and held in the movable section of the coin receiver or cradle by the coin receiver, and a projection on the arm engaging with and moving the coin retainer forward coincident with the advance of the movable section of the coin receiver or cradle, substantially as described.

4. In a coin controlled mechanism, the combination of a rock shaft, a coin receiver or cradle having a movable section fixed on the rock shaft, a coin retainer located below the movable section of the coin receiver or cradle and pivotally mounted on the rock shaft, means for giving a movement to the coin retainer independently of the coin receiver or cradle, an actuating lever having a downwardly extending arm and an upwardly extending arm with the downward arm loosely encircling the rock shaft, a shaft laterally projecting from the actuating lever at the juncture of the two arms, a head fixed on the shaft, an arm depending from the head and pivotally supported at its lower end, a plunger carried by the arm and adapted to engage a coin caught and held in the movable sections of the coin receiver or cradle by the coin retainer, a projection on the arm engaging with and moving the coin retainer forward coincident with the advance of the movable section of the coin receiver or cradle, a rack bar connected with the lateral shaft projecting from the lever, and a revoluble pinion for reciprocating the rack bar, substantially as described.

5. In a coin controlled mechanism, the combination of a rock shaft, a coin receiver or cradle consisting of a movable section and a fixed section and having the movable section fixedly mounted on and actuating the rock shaft, an actuating lever having a downwardly extending arm and an upwardly extending arm with the downward arm loosely encircling the rock shaft, means for oscillating the actuating lever and advancing the movable section of the coin receiver or cradle, a spring attached at one end to the upward arm of the actuating lever and at the other end to a stationary support, and a dash pot having one member pivotally attached to the end of the upward arm of the actuating lever and the other member pivotally attached to a fixed support, for the spring to act and return the actuating lever and the actuating means for the movable section of the coin receiver or cradle to normal position, and for the dash pot to act and cause a slow return of the actuating lever and the actuating means for the movable section of the coin receiver or cradle, substantially as described.

6. In a coin controlled mechanism, the combination of a rock shaft, a movable coin retainer loosely mounted on the rock shaft, an actuating lever loosely attached to the rock shaft, means operated by the advance of the actuating lever to advance the coin retainer, an arm connected with the coin retainer and having a vertical rising and falling movement at its free end, a spring having one end connected to the arm and the other end to a fixed support, and a dash pot having one member pivotally connected to the arm at its free end and the other member pivotally connected to a fixed support, for the spring to act and return the coin retainer to normal position and for the dash pot to act and cause a slow return of the coin retainer to normal position, substantially as described.

7. In a coin controlled mechanism, the combination of a rock shaft, a coin receiver or cradle consisting of a movable section and a fixed section, and having the movable section fixedly mounted on and actuating the rock shaft, an actuating lever having a downwardly extending arm and an upwardly extending arm with the downward arm loosely encircling the rock shaft, means for oscillating the actuating lever and advancing the movable section of the coin receiver or cradle, a spring attached at one end to the forward arm of the actuating lever and at the other end to a stationary support, a dash pot having one member pivotally attached to the end of the upward arm of the actuating lever and the other member pivotally attached to a fixed support, for the spring to act and return the actuating lever and the actuating means for the movable section of the coin receiver or cradle to normal position, and for the dash pot to act and cause a slow return of the actuating lever and the actuating means for the movable section of the coin receiver or cradle, a movable coin retainer loosely mounted on the rock shaft, means for advancing the coin retainer from the actuating lever, an arm connected with the coin retainer and having a vertical rising and falling movement at its free end, a spring having one end connected to the arm and the other end to a fixed support, and a dash pot having one member pivotally connected to the arm at its free end and the other member pivotally connected to a fixed support for the spring to act and return the coin retainer to normal position, and for the dash pot to act and cause a slow return of the coin retainer to normal position, substantially as described.

8. In a coin controlled mechanism, the combination of a rock shaft, a coin receiver or cradle having a movable section fixed on the rock shaft, a coin retainer located below the movable section of the coin receiver or cradle and pivotally mounted on the rock shaft means for giving a limited movement to the coin retainer from and coincident with and a movement independently of the coin receiver or cradle, an actuating lever having a downwardly extending arm and an upwardly extending arm with the downward arm loosely encircling the rock shaft, a shaft laterally projecting from the actuating lever at the juncture of the two arms, a head fixed on the shaft, a plunger connected with the head and adapted to engage a coin caught and held in the movable section of the coin receiver or cradle by the coin retainer, a bar connected at its forward end with the lateral shaft of the actuating lever, a rack on the rear end of the bar, and a revoluble pinion engaging the rack for reciprocating the bar and oscillating the actuating lever, advancing the movable section of the coin receiver or cradle and turning the rock shaft with the forward movement of the lever, substantially as described.

9. In a coin controlled mechanism, the combination of a rock shaft, a coin receiver or cradle having a movable section fixed on the rock shaft, a coin retainer located below the movable section of the coin receiver or cradle and pivotally mounted on the rock shaft, means for giving a limited movement to the coin retainer from and coincident with and a movement independently of the coin receiver or cradle, an actuating lever having a downwardly extending arm, and an upwardly extending arm, with the downward arm loosely encircling the rock shaft, a shaft laterally projecting from the actuating lever at the juncture of the two arms, a head fixed on the shaft, a plunger connected with the head and adapted to engage a coin caught and held in the movable section of the coin receiver or cradle by the coin retainer, a bar connected at its forward end with the lateral shaft of the actuating lever, a rack on the rear end of the bar, a revoluble pinion engaging the rack for reciprocating the bar and oscillating the actuating lever, advancing the movable section of the coin receiver or cradle and turning the rock shaft with the forward movement of the lever, a shaft having the pinion fixed thereon, a ratchet segment on the shaft, and a reversible pawl coacting with the ratchet segment and preventing a return of the actuating lever before a full throw thereof, substantially as described.

10. In a coin controlled mechanism, the combination of a rock shaft, a coin receiver or cradle having a movable section fixed on the rock-shaft, a coin retainer located below the movable section of the coin receiver or cradle and pivotally mounted on the rock shaft, means for giving a movement to the coin retainer independently of the coin receiver or cradle, an actuating lever having a downwardly extending arm and an upwardly extending arm with the downward arm loosely encircling the rock shaft, a shaft laterally projecting from the actuating lever at the juncture of the two arms, a head fixed on the shaft, an arm dependent from the head, and pivotally supported at its lower end, a plunger carried by the arm and adapted to engage a coin caught and held in the movable sections of the coin receiver or cradle by the coin retainer, a projection on the arm engaging with and moving the coin retainer forward coincident with the advance of the movable secetion of the coin receiver or cradle, a rack bar connected with the lateral shaft projecting from the actuating lever, a pinion for reciprocating the rack bar, a shaft for the pinion, a segmental ratchet on the shaft, and a reversible pawl coacting with the segmental ratchet for preventing a return of the actuating lever before a full throw thereof, substantially as described.

11. In a coin controlled mechanism, the combination of a coin receiver or cradle having a movable section, a rearwardly extending plate connected with the movable section of the coin receiver or cradle and having notches in its vertical edge, a stop engaging the notches, swinging arms carrying the stop, a spring operating to advance the swinging arms into engaging position, and means for holding the swinging arms out of engaging position against the force of the spring, substantially as described.

12. In a coin controlled mechanism having a coin receiver or cradle with a movable section, the combination of a fixed rod, a coil spring encircling the fixed rod, a pair of arms pivotally mounted on the fixed rod and having a cross plate connecting the arms, and engaged by one end of the coil spring, a rod fixed in the upper ends of the swinging arms, a sleeve on the rod, and a rearwardly extending plate connected with the movable section of the coin receiver or cradle and having notches in its vertical edge to coact with the sleeve and hold the movable section of the coin receiver or cradle against return after a partial advance throw has been made, substantially as described.

13. In a coin controlled mechanism having a coin receiver or cradle with a movable section, the combination of a fixed rod, a coil spring encircling the fixed rod, a pair of arms pivotally mounted on the fixed rod and having a cross plate connecting the arms and engaged by one end of the coil spring, a rod fixed in the upper ends of the swinging arms, a sleeve on the rod, a projection on one of the swinging arms, a reciprocating bar having a projection thereon engaging the projection of the swinging arm, means for reciprocating the bar, and a rearwardly extending plate connected with the movable section of the coin receiver or cradle and having notches in its vertical edge to coact with the sleeve and hold the movable section of the coin receiver or cradle against a return until the limit of its advance throw has been reached, substantially as described.

14. In a coin controlled mechanism, the combination of a rock shaft, a movable section of a coin receiver or cradle fixedly mounted on the rock shaft, an actuating lever loosely attached to the rock shaft, a shaft laterally extending from the actuating lever, a bar connected with the actuating lever shaft, a rack on the bar, a pinion engaging the rack and reciprocating the bar, a swinging frame carrying a stop and having a projection engaging with a projection on the reciprocating bar, a spring operating to advance the swinging frame, and a rearwardly extending plate connected with the movable section of the coin receiver or cradle and having notches in its vertical edge for engagement with the stop of the swinging frame, substantially as described.

15. In a coin controlled mechanism, the combination of a movable section of a coin receiver or cradle, a movable coin retainer, a rearwardly extending plate connected with the movable section of the coin receiver or cradle and having notches in its vertical edge, a rearwardly-extending plate connected with the movable coin retainer and having a notch in its vertical edge, a swinging frame, a stop carried by the swinging frame and engaging the notches of the plates, a spring operating to throw the swinging frame in the direction of its advance position, and means for returning the swinging frame with its stop to normal position, substantially as described.

16. In a coin controlled mechanism, the combination of a movable coin retainer, a rearwardly extending plate connected with the movable coin retainer and having a notch in its vertical edge, a swinging frame, a stop carried by the swinging frame and adapted to engage the notch of the plate, a spring operating to force the swinging frame to its advance position for engagement with the notch of the plate, and means for returning the swinging frame and its stop to normal position and out of engagement with the notch, substantially as described.

17. In a coin controlled mechanism, the combination of a rock shaft, an actuating lever consisting of a downwardly extending arm and an upwardly extending arm with the downward arm loosely encircling the rock shaft, means for advancing the actuating lever, a spring attached to the upward arm of the actuating lever for returning the lever, and a dash pot having one member connected with the end of the upward arm of the lever for preventing a rapid return of the lever to normal position, substantially as described.

18. In a coin controlled mechanism, the combination of a rock shaft, a coin retainer loosely mounted on the rock shaft, means for advancing the coin retainer, an arm rearwardly extending from the coin retainer and having a vertical rising and falling movement at its free end, a spring for returning the coin retainer and arm to normal position, and a dash pot having one member pivotally connected with the free end of the arm and the other member pivotally connected to a fixed support for preventing a rapid return of the coin retainer and arm, substantially as described.

19. In a coin controlled mechanism having a coin receiver with a movable section and a coin retainer, a rock shaft carrying the movable section of the coin receiver and the coin retainer, an actuating lever on the rock shaft, a shaft laterally extending from the actuating lever, a bar connected with the actuating lever shaft and having thereon a rack with a groove in the face of the rack, a pinion engaging the rack bar, a shaft for the pinion, and a washer on the shaft entering the groove of the rack bar, substantially as described.

20. In a coin controlled mechanism, the combination of a coin receiver or cradle having a movable section, a coin retainer located below the movable section of the coin receiver or cradle, a spring controlled frame rearward of the coin receiver or cradle and the coin retainer, a stop carried by the frame, a notched plate rearwardly extending from the movable section of the coin receiver or cradle, and a notched plate rearwardly extending from the coin retainer, for the stop to engage the notches of both plates and prevent a partial advance and return of both the movable section of the coin receiver or cradle and the coin retainer, substantially as described.

21. In a coin controlled mechanism, the combination of a coin receiver or cradle having a movable section, a coin retainer located below the movable section of the coin receiver or cradle, a spring controlled frame rearward of the coin receiver or cradle and the coin retainer, a stop carried by the frame, a notched plate rearwardly extending from the movable section of the coin receiver or cradle, a notched plate rearwardly extending from the coin retainer, for the stop to engage the notches of both plates and prevent a partial advance and return of both the movable section of the coin receiver or cradle and the coin retainer, and means for returning the spring controlled frame to normal position and disengaging the notched plates from the stop, substantially as described.

22. In a coin controlled mechanism, the combination of a coin receiver or cradle having a movable section, a coin retainer located below the movable section of the coin receiver or cradle, and a spring catch located in the line of movement of the movable section of the coin receiver or cradle and adapted to engage a stuck coin and release the coin with the return movement of the movable section of the coin receiver or cradle, substantially as described.

23. In a coin controlled mechanism, the combination of a coin chute, a coin receiver or cradle having a movable section, a coin retainer located below the movable section of the coin receiver or cradle, and a deflector consisting of an arm to engage a coin in the coin receiver or cradle, and an arm with its end projecting through the coin chute and operating to turn a descending coin out of its path of travel, substantially as described.

24. In a coin controlled mechanism, the combination of a coin chute, a coin receiver or cradle having a movable section, a coin retainer located below the movable section of the coin receiver or cradle, and a deflector pivotally mounted and consisting of an arm to engage a coin previously deposited in the coin receiver or cradle, an arm with its end projecting through the coin chute into the path of travel of a descending coin, and an arm engaged by a movable part of the discharging mechanism for preventing the deposit of more than one coin in the receiver or cradle, substantially as described.

JOHN E. PACKARD.

Witnesses:
OSCAR W. BOND,
WALKER BANNING.